March 14, 1933.  J. NORWORTH  1,901,186
APPARATUS FOR TESTING PHOTOPAPER
Filed Feb. 17, 1932
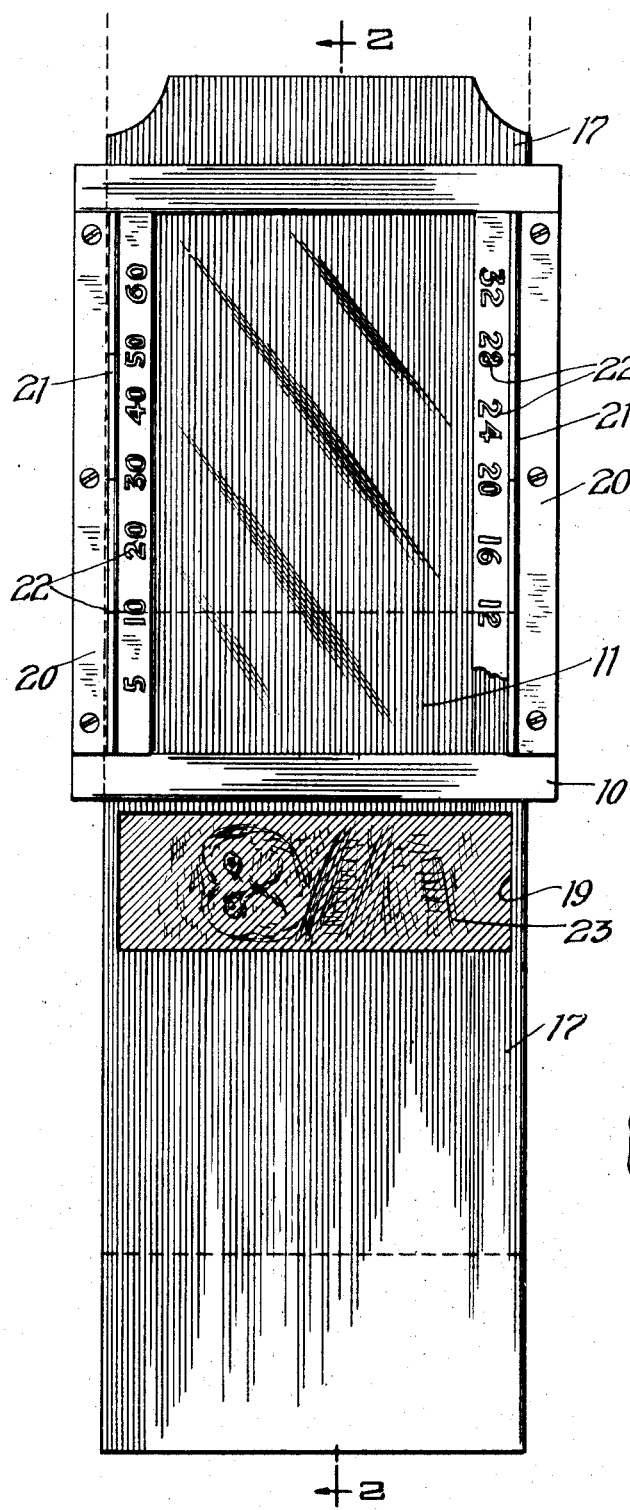
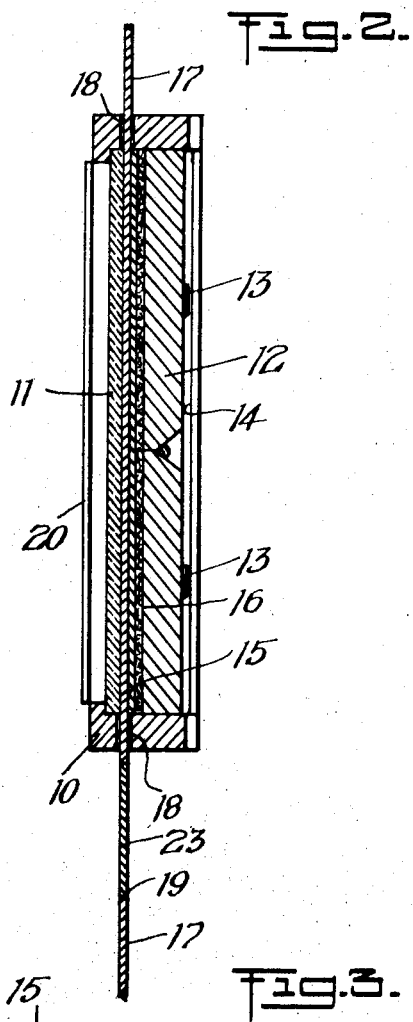
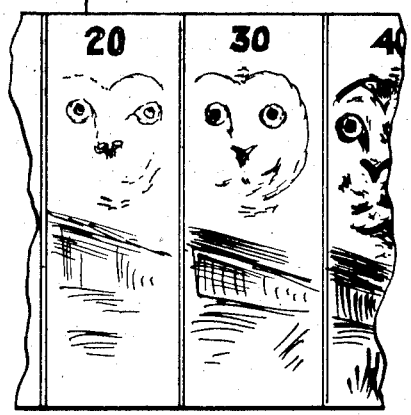
INVENTOR
*Jack Norworth*
BY HIS ATTORNEY Patented Mar. 14, 1933

1,901,186

UNITED STATES PATENT OFFICE

JACK NORWORTH, OF NEW YORK, N. Y.

APPARATUS FOR TESTING PHOTOPAPER

Application filed February 17, 1932. Serial No. 593,548.

This invention relates to an apparatus for testing photo-paper, and more particularly photo-paper used in printing directly from a negative.

Among the principal objects which the present invention has in view are: To provide means for testing photographic paper with minimum waste; to make the test by use of the same negative throughout; to indicate directly upon the paper the period of exposure; to provide for a considerable range of exposures to be indicated; to enable the test to be made rapidly and effectively; to secure simplicity of construction and operation; and to obtain other advantages and results as may be brought out in the following description.

Drawing:—

Figure 1 is a plan of my invention;

Figure 2 is a longitudinal sectional view taken on the line 2—2 of Figure 1; and Figure 3 is a fragmentary portion of paper which has been exposed for test purposes.

Description:—

In the specific embodiment of the invention illustrated in said drawing, the reference numeral 10 indicates a printing frame, the face of which is open and provides an inwardly projecting rim for overlying a marginal edge of a glass or other suitable window 11. At the back of the frame is provided a suitable closure 12 of substantially the interior dimension of the frame so as to fit within the same and be pressed toward the glass by means of suitable leafsprings 13 which may be pivoted to the closure as usual and insertable at their ends when depressed into grooves 14 provided for that purpose in the frame. As here shown the closure is hinged transversely at a middle part of itself so that the proper introduction of sensitized paper 15 may be effected as usual in photographic printing frames. The face of the closure toward the glass is preferably covered with a suitable mat 16 such as felt.

Between the glass 11 and closure 12 is positioned a slide 17 which projects at its opposite ends through slots 18 in the end members of the frame and which may have its side edges within the bounds of the frame engaged within the grooves extending longitudinally of the side members of the frame. This slide is preferably opaque for the greater part of its area and provides one end portion which will entirely cover the glass to prevent passage of light through the frame. However, the slide may be moved longitudinally, and beyond the portion just mentioned, is an opening 19 which can then be brought by the sliding movement into registration with a portion of the window 11. This opening 19 is of much less area than the window and has a short dimension in the direction of sliding so that it may be brought to successive positions in the window area. Beyond the opening 19 the slide continues with another opaque end portion which will cover the portion of the window passed over by the opening in moving the slide longitudinally.

Time designations may be provided longitudinally of the frame 10 to be simultaneously exposed when the exposure is made through the opening 19. To this end, I have shown a pair of stencil bars 20, 20, one at each longitudinal side of the window. These stencil bars are preferably removable from juxtaposed position in front of the window so that either one may be used at the option of the user. As here shown, each bar is hinged longitudinally as at 21. As shown in Figure 1, both stencil bars are swung into printing position over the window but it will be understood that in use either bar will be rotated on its hinge so as to no longer be juxtaposed to the window, but to lie, instead, flatwise upon the frame member to which it is hinged. The stencil bars have numbers 22 therein so that whatever number overlies opening 19 in adjusted position thereof will print through the sensitized paper. By placing the opening under the number representing the approximate seconds of exposure it will be very easy to identify the resulting print as to the length of exposure and decide upon the length of time which the paper requires for best results.

In order to obtain a comparative effect of the several exposures, a film, plate or the like 23 may be included within opening 19 as the same is introduced into juxtaposition to the window, and consequently in the resulting print there will be a reproduction of the same picture for comparative purposes as clearly shown in Figure 3. As each picture has the seconds of exposure printed thereupon a proper selection can then be made of exposure for the paper for printing purposes.

Obviously detail changes and modifications may be made in the construction and use of my improved apparatus for testing photo-paper, and I do not wish to be understood as limiting myself to the exact construction shown, or described except as set forth in the following claims when construed in the light of the prior art.

I claim:

1. An apparatus as characterized comprising a frame, means for supporting sensitized paper therein, a slide having an opening of less size than the frame and adapted to be brought to various positions in the frame and obtain an exposure therethrough at different parts of the sensitized paper, and means for simultaneously printing an exposure designation with each exposure through the opening.

2. An apparatus as characterized comprising a frame, means for supporting sensitized paper therein, a slide having an opening of less size than the frame, a negative in said opening adapted to be successively juxtaposed at different parts of the sensitized paper whereby various exposures of the same negative on the same sensitized paper may be obtained and compared, and means for simultaneously printing an exposure designation with each exposure of said negative.

3. An apparatus as characterized comprising a frame, means for supporting sensitized paper therein, a slide having an opening of less size than the frame and adapted to be brought to various positions in the frame and obtain an exposure therethrough at different parts of the sensitized paper, and a stencil bar having exposure designations adapted to be juxtaposed with respect to the opening whereby a designation desired may be printed through the opening.

JACK NORWORTH.